United States Patent
Boulais et al.

(10) Patent No.: US 10,014,587 B1
(45) Date of Patent: Jul. 3, 2018

(54) RETROREFLECTING CHAFF FOR LASER DEFENSE

(71) Applicants: Kevin A. Boulais, La Plata, MD (US); Thomas L. Wilson, King George, VA (US)

(72) Inventors: Kevin A. Boulais, La Plata, MD (US); Thomas L. Wilson, King George, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/239,829

(22) Filed: Aug. 18, 2016

Related U.S. Application Data

(63) Continuation-in-part of application No. 13/374,641, filed on Dec. 8, 2011, now abandoned.

(51) Int. Cl.
*H01Q 15/14* (2006.01)
*H01Q 15/18* (2006.01)
*G02B 5/122* (2006.01)
*H01Q 15/08* (2006.01)

(52) U.S. Cl.
CPC .......... *H01Q 15/145* (2013.01); *G02B 5/122* (2013.01); *H01Q 15/18* (2013.01); *H01Q 15/08* (2013.01)

(58) Field of Classification Search
CPC ...... H01Q 15/145; H01Q 15/18; H01Q 15/08; G02B 5/122; G02B 5/124
See application file for complete search history.

(56) References Cited

U.S. PATENT DOCUMENTS

| 2,475,633 A | * | 7/1949 | Morris | H01Q 15/20 342/8 |
| 2,746,035 A | | 5/1956 | Norwood | 342/7 |

(Continued)

FOREIGN PATENT DOCUMENTS

WO   WO 2007136308 A1 * 11/2007 ............... G01S 7/38

OTHER PUBLICATIONS

R. B. Nilson and X. J. Lu, "Optimum design of spherical retroreflectors with regractive indices close to 2.0," Transactions of the Institute of Measurements and Control, vol. 18, pp. 212-215, 1996.*

(Continued)

*Primary Examiner* — Matthew M Barker
(74) *Attorney, Agent, or Firm* — Gerhard W. Thielman, Esq.

(57) ABSTRACT

Chaff is provided for deployment from an aerial platform for retro-reflecting electromagnetic radiation projected to the platform. The chaff includes a plurality of retro-reflecting particles, with each particle being a retro-reflector. The plurality forms a cloud having aerial buoyancy. The particles can be a corner reflector with adjacent sides substantially perpendicular to one another, and in particular a trihedral corner reflector. Alternatively, the particles can be lens reflectors, such as a cat's eye. In addition, chaff is provided for deployment from an aerial platform for retro-reflecting electromagnetic radiation projected to the platform. The chaff includes a plurality of retro-reflecting particles and a substrate. Each particle of the plurality is a retro-reflector. The substrate attaches the plurality of particles.

5 Claims, 8 Drawing Sheets

(56) References Cited

U.S. PATENT DOCUMENTS

| | | | | |
|---|---|---|---|---|
| 3,126,544 A * | 3/1964 | Greatbatch, Jr. | F41H 11/02 342/12 |
| 3,953,850 A | 4/1976 | Redman | 342/167 |
| 4,028,701 A * | 6/1977 | Parks | H01Q 15/20 342/8 |
| 4,072,948 A | 2/1978 | Drews et al. | 342/7 |
| 4,099,183 A | 7/1978 | Wolff | 342/6 |
| 4,149,304 A * | 4/1979 | Brynjegard | B21D 13/04 29/434 |
| 4,446,793 A * | 5/1984 | Gibbs | F42B 12/70 102/359 |
| 4,517,569 A * | 5/1985 | Gerharz | G01S 13/75 342/6 |
| 4,531,128 A * | 7/1985 | Mensa | H01Q 15/18 342/7 |
| 4,683,824 A * | 8/1987 | Gibbs | F42B 5/15 102/436 |
| 4,695,481 A | 9/1987 | Billard | 342/8 |
| 4,733,236 A | 3/1988 | Matosian | 342/7 |
| 4,823,131 A * | 4/1989 | Bell | H01Q 15/18 114/326 |
| 4,852,452 A | 8/1989 | Barry et al. | 89/1.11 |
| 5,047,782 A | 9/1991 | Law et al. | 342/169 |
| 5,061,929 A | 10/1991 | Bell | 231/10 |
| 5,212,488 A * | 5/1993 | Konotchick | G01S 7/38 342/1 |
| 5,589,961 A | 12/1996 | Shigeta et al. | 359/529 |
| 5,671,869 A * | 9/1997 | Althouse | H01Q 15/145 222/1 |
| 6,017,628 A * | 1/2000 | Stevens | H01Q 17/00 205/119 |
| 6,047,644 A * | 4/2000 | Malecki | F41H 9/06 102/334 |
| 6,061,012 A | 5/2000 | Sakimura | 342/5 |
| 6,507,307 B1 | 1/2003 | Huber, Jr. | 342/9 |
| 6,559,790 B1 * | 5/2003 | Buehler | G01S 7/38 342/6 |
| 6,650,269 B1 | 11/2003 | Huber, Jr. | 342/12 |
| 6,688,032 B1 * | 2/2004 | Gonzalez | F42B 12/50 102/485 |
| 6,742,903 B2 | 6/2004 | Canning | 359/529 |
| 6,876,320 B2 * | 4/2005 | Puente Baliarda | H01Q 15/145 342/12 |
| 7,369,081 B1 | 5/2008 | Ganz et al. | 342/12 |
| 7,400,287 B2 * | 7/2008 | Saccomanno | H01Q 15/145 244/3.1 |
| 7,533,615 B1 | 5/2009 | Ganz et al. | 102/505 |
| 7,623,059 B2 | 11/2009 | Klein | 342/12 |
| 7,847,721 B1 | 12/2010 | Carlsson et al. | 342/6 |
| 7,965,220 B2 | 6/2011 | Ganz et al. | 342/8 |
| 2001/0019775 A1 * | 9/2001 | Warfel | C01B 33/32 428/469 |
| 2004/0080447 A1 | 4/2004 | Bas | 342/5 |
| 2010/0283655 A1 * | 11/2010 | Dunn | F42B 12/382 342/12 |
| 2011/0216411 A1 * | 9/2011 | Reed | B29D 11/00605 359/530 |
| 2013/0009801 A1 | 1/2013 | Carlsson | 342/8 |
| 2013/0300594 A1 * | 11/2013 | Rard | H01Q 15/18 342/7 |

OTHER PUBLICATIONS

Webster, C.A.G. "Optimum design of spherical retroreflectors with refractive indices close to 2.0," Transactions of the Institute of Measurements and Control, vol. 18, pp. 212-215. 1996.*

P. Moitra et al.: "Experimental demonstration of a broadband all-electric metamaterial perfect reflector", *App. Phys Lett.* 104 171102 (2014). http://aristotle.sri.com/srini/95-APL.pdf.

P. Moitra et al.: "Large-Scale All-Dielectric Metamaterial Perfect Reflectors", *ACS Photonics* 2 692-698 (2015). http://www.vanderbilt.edu/vinse/acsphotonics_5b001481.pdf.

* cited by examiner

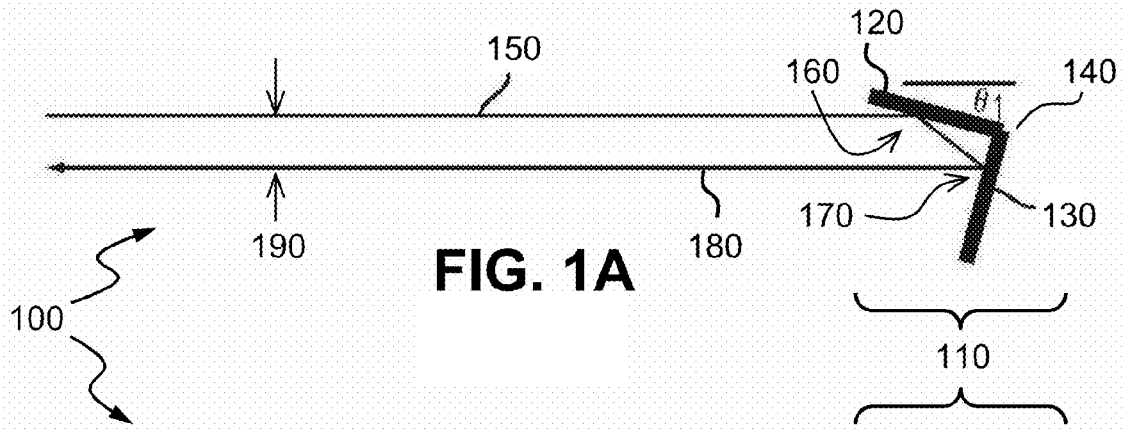
FIG. 1A
FIG. 1B
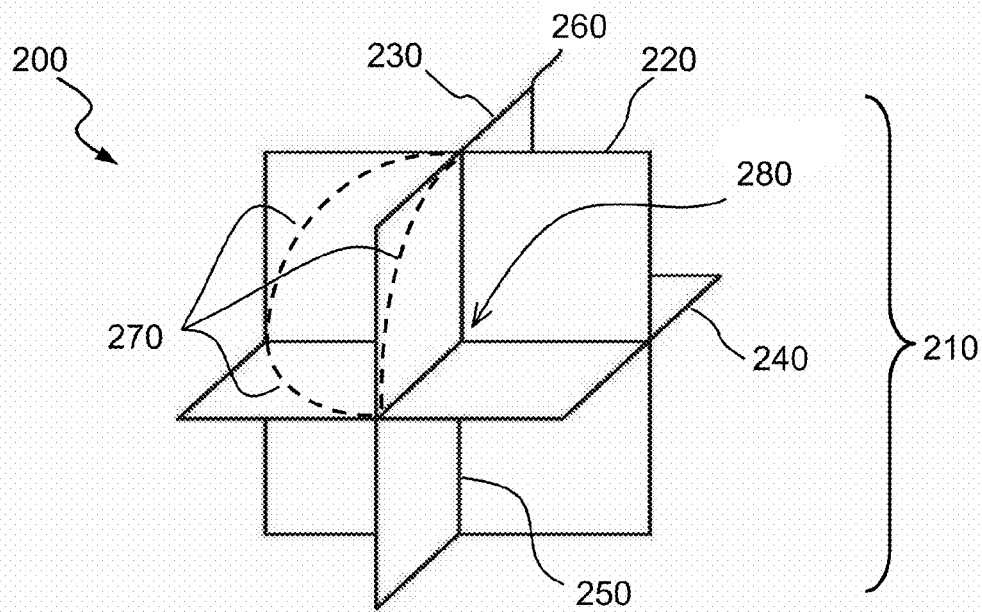
FIG. 2

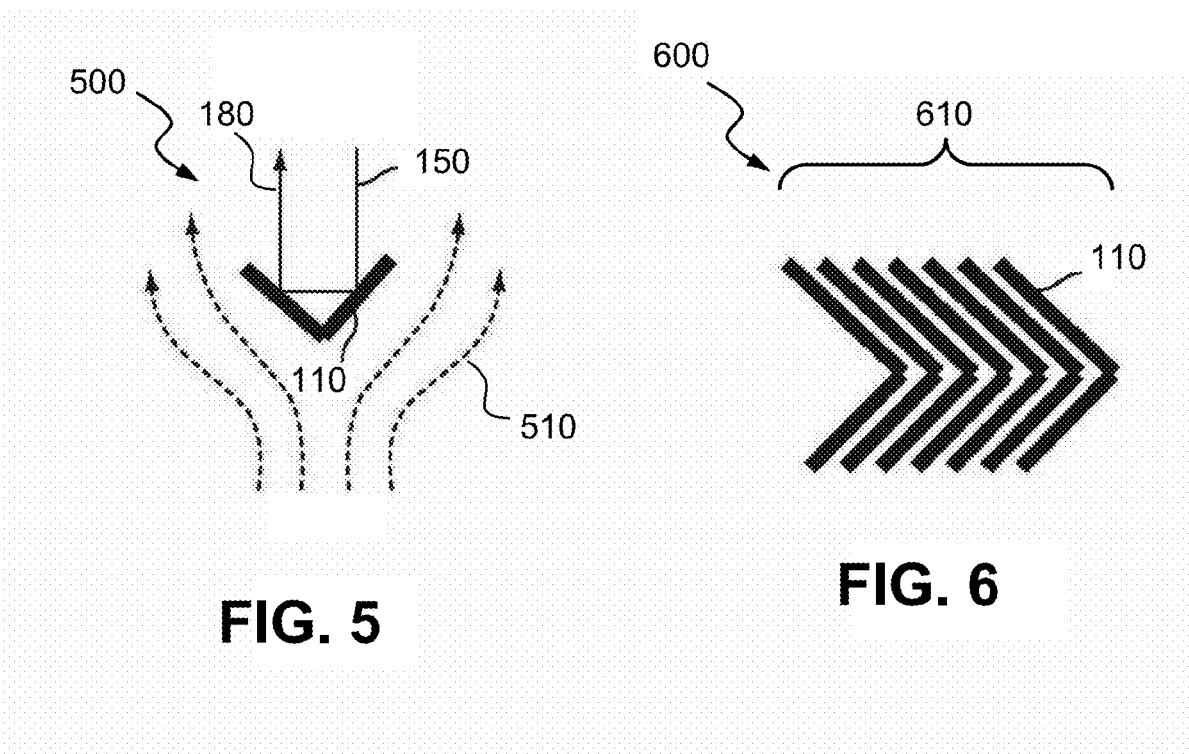
FIG. 5
FIG. 6
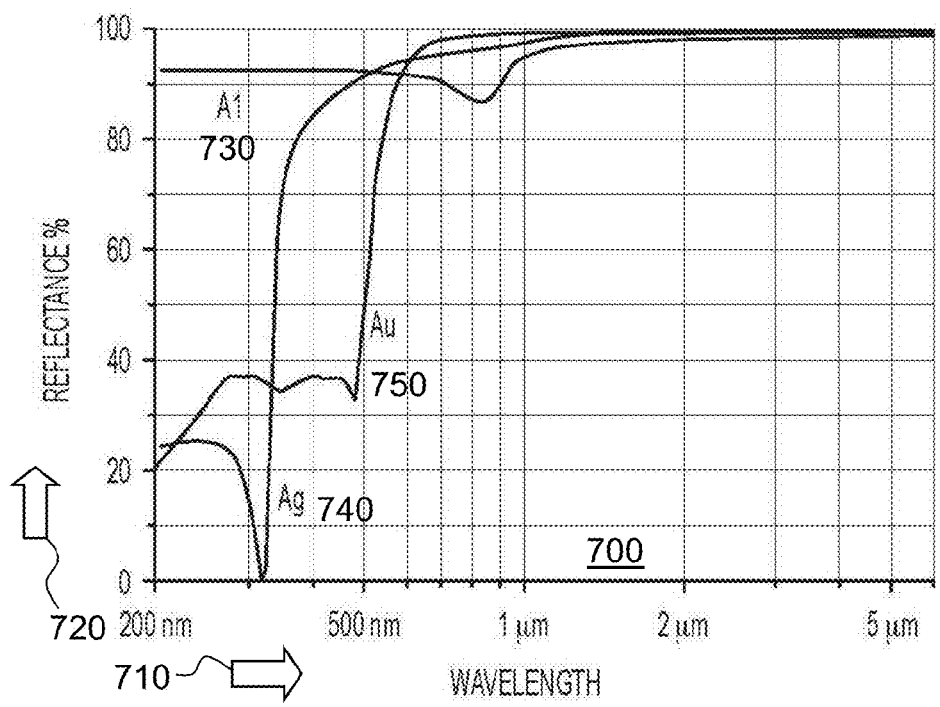
FIG. 7

RETROREFLECTING CHAFF FOR LASER DEFENSE

CROSS REFERENCE TO RELATED APPLICATION

The invention is a Continuation-in-Part, claims priority to and incorporates by reference in its entirety U.S. patent application Ser. No. 13/374,641 filed Dec. 8, 2011 and assigned Navy Case 100617.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to chaff created to defeat target acquisition. In particular, the invention relates to multiple deflectors of electromagnetic energy away from an intended target.

The concept of chaff goes back as far back as 1937, but not until 1942 was chaff investigated for military use. Typically, aircraft use chaff as a false target to counter against radar-guided missiles. However, chaff can also be used for distress signals so friendly radar can find military platforms that may otherwise have damaged communication systems. Concepts for directed energy weapons have been around for many decades. Incrementally, technology has advanced to a point that the large amounts of energy necessary for directed energy weapons can be stored efficiently and in "relatively" small volumes.

However, directed energy possesses a significant disadvantage of carrying very little momentum and can easily be reflected, or deflected. Electromagnetic waves have very little momentum rendering their reflection or deflection fairly straightforward. For example, the momentum of a projectile that weighs 1 kg can be compared to a light beam that has a micrometer wavelength of 10.6 μm (a typical $CO_2$ laser used to cut steel). Holding the energy constant in both cases to 100 joules (J), the momentum for each case can be calculated.

For the projectile, the velocity, v can be calculated from the energy E and mass, m by formula:

$$v = \sqrt{\frac{2E}{m}} = \sqrt{(2)(100 \text{ J})/1 \text{ kg}} = 14.14 \text{ m/s}. \tag{1}$$

Thus, the momentum for the projectile can be calculated by formula:

$$P_p = m \cdot v = (1 \text{ kg})(14.14 \text{ m/s}) = 14.14 \text{ N}, \tag{2}$$

where 1 newton (N)=1 kg-m/s. For the light beam, the energy in the laser beam is determined by formula:

$$E = \frac{nhc}{\lambda}. \tag{3}$$

where h is Planck's constant equals $6.626 \cdot 10^{-34}$ m²-kg/s, c is the speed of light in vacuum, λ is the wavelength of the laser, and n is the number of photons.

The momentum of laser beam photons is determined by formula:

$$P_l = \frac{nh}{\lambda}. \tag{4}$$

The momentum of the laser beam having 100 J of energy can be calculated as:

$$P_l = E/c = (100 \text{ J})/(3 \cdot 10^8 \cdot \text{m/s}) = 3.3 \cdot 10^{-7} N. \tag{5}$$

So the momentum of light photon is $3.3 \cdot 10^{-7}$ N versus 14.14 N for the projectile. Thus, the projectile has 4,246,246,246% more momentum than the light beam, even though they both have the same 100 J of energy.

Conventional chaff is designed to scatter electromagnetic radiation from a source to inhibit detection and target acquisition from a hostile adversary. In some cases, conventional chaff can be used to block electromagnetic radiation in the form of obscurants.

SUMMARY

Conventional chaff configurations yield disadvantages addressed by various exemplary embodiments of the present invention. In particular, exemplary embodiments provide chaff that returns electromagnetic radiation to its source for purposes of disablement. These embodiments provide for retro-reflective chaff by particulate fabrication with individual retro-reflection.

Various exemplary embodiments provide chaff for deployment from an aerial platform for retro-reflecting electromagnetic radiation projected to the platform. The exemplary chaff includes a plurality of retro-reflecting particles, with each particle being a retro-reflector. The plurality forms a cloud having aerial buoyancy. The particles can be a corner reflector with adjacent sides substantially perpendicular to one another, and in particular a trihedral corner reflector. Alternatively, the particles can be lens reflectors, such as a cat's eye. In addition, chaff is provided for deployment from an aerial, ground or sea platform for retro-reflecting electromagnetic radiation projected to the platform. The chaff includes a plurality of retro-reflecting particles and a substrate. Each particle of the plurality is a retro-reflector. The substrate attaches the plurality of particles.

Various exemplary embodiments alternatively or additionally provide individual chaff particulates attachable to ribbons or confetti from various materials, including those with indices of refraction that differ from the chaff material. Alternate exemplary embodiments provide retro-reflecting chaff to return electromagnetic energy to its source. Exemplary embodiments provide a method for neutralizing an electromagnetic emitter by releasing the retro-reflecting chaff composed of particles, each having a geometry adapted to redirect the electromagnetic radiation back to the source and away from its intended target. Alternative embodiments provide for the particles having a variety of sizes to reflect radiation at different wavelengths.

The above and other features described in exemplary embodiments, including various novel details of construction and combinations of parts, will now be more particularly described with reference to the accompanying drawings and pointed out in the claims. The principles and features of this invention may be employed in various and numerous embodiments without departing from or otherwise limiting the scope of the invention.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 1A and 1B are a schematic drawings showing a corner reflector reflecting light rays in a direction back onto themselves, independent of the orientation of the corner reflector;

FIG. 2 is an isometric view of eight corner reflectors forming trihedrals in a single unit to enable multi-directional functionality;

FIG. 5 is an elevation view of a corner reflector orienting itself naturally for space-based laser, sensor (e.g., radar) or communication systems as the corner reflector falls through the air;

FIG. 6 is an elevation view of a plurality of stacked corner reflectors for compact storage before tactical deployment;

FIG. 7 is a graphical view of reflectance of gold, silver and aluminum at various wavelengths;

DETAILED DESCRIPTION

Figure 3:
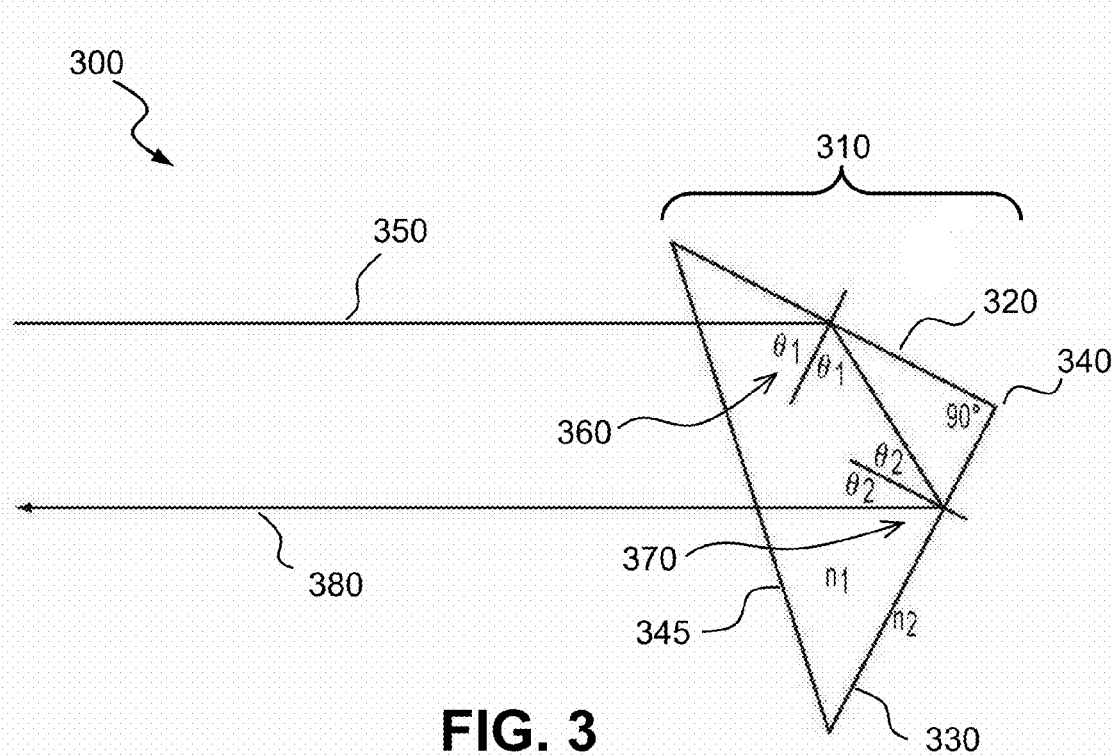
FIG. 3 is an elevation view of a prism used as a corner reflector.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs metric units with the following abbreviations: length in micrometers (μm) or meters (m), mass in milligrams (mg) or kilograms (kg), time in seconds (s), angles in degrees (°) or radians (rad), energy in joules (J). Supplemental measures can be expressed derived from these, such as density in micrograms-per-cubic-meters ($\mu g/m^3$) or milligrams-per-cubic-meter ($mg/m^3$), and the like.

The Oxford Dictionary defines "chaff" as "strips of metal foil or metal filings released in the atmosphere from aircraft, or deployed from missiles, to obstruct radar detection or confuse radar-tracking missiles." These typical types of chaff are often designed to resonate with the radio frequency of an electromagnetic wave to enhance multi-directional scattering. They are designed to provide passive defense of a platform such as an aircraft against missile threats, for example, but are not designed to be used in an offensive manner.

Exemplary embodiments provide an exemplary type of chaff with the additional capability to retro-reflect, and thus can be used in an offensive manner in addition to a more typically defensive manner to serve as decoys. Of particular interest is retro-reflection of laser energy directed towards a target, for which return radiation can serve to degrade or disable the laser source. Retro-reflectors, also called retroflectors or cataphotes, reflect electromagnetic radiation back to its source with minimal scattering. The reflection vector is parallel and opposite in direction to the emission source vector. The mechanism of retro-reflection can include many examples including the octal trihedral, Porro prism, cat's eye, Luneburg lens, and there could even be potentially new mechanisms yet to be developed. They can be fabricated purely from metals, purely from dielectrics or a combination of metals and dielectrics. For example, the reflectivity of a metal layer can be enhanced with a dielectric layer.

Additionally, a layer of pure dielectric spheres has been shown to result in extremely high reflection, which could be fabricated in a retro-reflection manner. Published results are available at *Phys. Rev. B* 88, 165116 (2013) and *Appl. Phys. Lett.* 104, 171102 (2014); highlighted in *Nature Photonics* 8, 498 (2014). Exemplary embodiments provide novel chaff that can be used offensively, as well as defensively, without limiting the mechanism for obtaining retro-reflection. In particular, the exemplary chaff includes ability to damage a high energy laser directed at an intended target that dispenses the chaff.

Exemplary embodiments describe three principle aspects of the retro-reflective chaff:
(1) the retro-reflective chaff has the same intrinsic physical deployment behaviors as all other chaff types (e.g., the ability to loiter as a cloud);
(2) each chaff unit exhibit rotationally indifferent optical retro-reflectance; and
(3) chaff can loiter or fall at a predetermined rate based on size and weight.

Physical devices unable to satisfy these criteria do not constitute retro-reflective chaff. Instead, retro-reflective chaff physical requirements include storability in a small compact volume (e.g., within a launch canister) until deployment by mechanisms currently used for conventional chaff. Thus, deployment can control the shape and density of the cloud to have different offensive and defensive effects. However, retro-reflective chaff can be combined with conventional chaff to amplify the effects.

FIGS. 1A and 1B show elevation views 100 of a corner reflector 110, which represents one example of retro-reflector geometry. The corner reflector 110 comprises first and second adjacent flanges 120 and 130 perpendicularly fused at a joint 140. From an electromagnetic source (not shown) an emission beam 150 strikes the first flange 120 at an incident point 160. The first flange 150 is tilted relative to the emission beam 150 by an angular offset of first angle $\theta_1$. The beam 150 reflects from the second flange 130 at a reflection point 170 to return towards the source by a reflection beam 180 offset from the emission beam 150 by a displacement 190.

By changing the tilt of the first flange 120, the angular offset can be shifted to a second angle $\theta_2$. Although changing the angular offset angle can alter the displacement 190, the reflection returning to the source is independent of the corner reflector's angle from $0° \leq \theta \leq 90°$. As shown in views 100, the corner reflector 110 is a dihedral for clarity, but a more effective design could be a trihedral with all planes forming internal angles of 90° (or $\pi$ radians).

FIG. 2 shows an isometric view 200 of a multi-corner reflector unit 210 forming eight-corner reflectors as trihedrals to enable multi-directional functionality. The reflector unit 210 comprises mutual perpendicular flanges oriented along vertical 220, lateral 230 and horizontal 240 planes. Two adjacent flanges share an intersection line 250. Each flange can terminate in corners 260 or by rounded edges 270. The three intersecting lines 250 join together at the corner junction 280. The unit 210 can be composed of light-weight plastic, or biodegradable material such as corn-starch or wood, and overlaid with a metallic layer for enhanced reflectivity.

The reflector unit 210 comprising three perpendicular planes can form eight corner reflectors within a single trihedral. This configuration can operate in any orientation. The outer corners 260 can be rounded to form circular edges 270 so the overall shape is a sphere or an alternative geometry. The size of the particles, and of the confetti or ribbon can be selected based on the concept of operation. For select circumstances, the exemplary chaff can be designed to loiter for extended periods. Alternatively, the exemplary chaff can be configured to fall so as to provide a directional vector with which to divert the offensive seeker. In yet other alternatives, the retro-reflective chaff can be combined with conventional radio-frequency reflecting chaff.

Other types of retro-reflectors can be used for chaff. FIG. 3 shows an elevation view 300 of a Porro prism 310 used as a corner reflector. The prism 310 includes first and second reflective sides 320 and 330 perpendicularly joined at a corner 340, as well as a transmit side 345. An emission beam 350 enters the transmit side 345 to impinge the first side 320 at an incident point 360. The first side 320 reflects the electromagnetic radiation at an angle of $2 \cdot \theta_1$ to the second side 330. The reflected radiation impinges the second side 330 at a reflection point 370. The second side 330 reflects the electromagnetic radiation at an angle of $2 \cdot \theta_2$ to exit the transmit side 345 as a reflection beam 380.

The Porro prism 310 utilizes the same 90° angle as in a corner reflector 110, but instead of using a mirrored reflective surface, the prism uses total internal reflection. As shown in view 300, total internal reflection is caused by a difference in index of refraction between the prism material and the material outside the prism, which usually will be air. Total internal reflection occurs when both internal angles $\theta_1$ and $\theta_2$ are greater than the critical angle $\theta_c$ given by:

$$\theta_c = \arcsin\left(\frac{n_2}{n_1}\right). \tag{6}$$

where $n_2$ is the index of refraction of the air, and $n_1$ is the index of refraction of the prism, which is assumed to be more optically dense than the air. Thus, the ratio $n_2/n_1$ is typically less than unity. As with the corner reflector 110, multiple prisms can be fabricated in multi-corner units 210 in order to be effective towards electromagnetic radiation from any direction.

Figure 4:
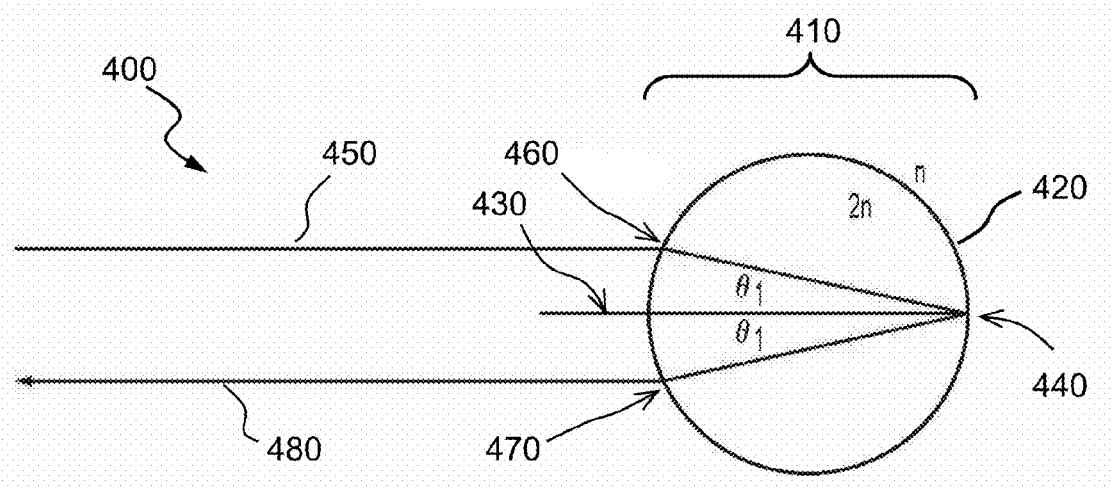
FIG. 4 is an elevation view of a cat's eye used as a corner reflector.

FIG. 4 shows an elevation view 400 of a spherical cat's eye 410 used as a lens reflector. The cat's eye 410 includes a spherical boundary 420 with a horizontal centerline 430 that intercepts the boundary 420 at a reflection point 440. The centerline 430 is parallel to the emission beam 450 from a source (not shown), which enters the boundary 420 at an incident position 460. Depending on the sphere's index of refraction, the electromagnetic radiation travels through the cat's eye 410 to return at angle $2 \cdot \theta_1$ to the reflection point 440 through the cat's eye 410. The radiation exits at a return position 470 and returns as a reflection beam 480 parallel to the emission beam 450. A Luneburg lens constitutes a similar spherical configuration, albeit with density gradients, and therefore having variable indices of refraction.

As an alternative example, the so-called cat's eye reflector 410 can also be used for chaff. By fabricating transparent spheres (at the wavelengths of interest) that have an index of refraction (n) twice that of the surrounding material (usually air), then a back mirrored surface is not required (as in some versions) and the sphere functions at any rotational angle. An added advantage of the spherical shape of the cat's eye reflector 410 is that these can be sufficiently small to loiter by buoyancy, approaching a diameter of a few wavelengths long. (In the optical realm, such diameters would be on the order of one micrometer.) The corresponding density (mass per unit volume) can be adjusted for a desired loiter time, for example.

Retro-reflective particulates of the exemplary chaff can be attached to ribbons or confetti fabricated from various materials, depending on the purpose. For example, retro-reflective chaff can be attached to materials having indices of refraction that differ from that of the particulate material. In particular, the cat's eye reflector 410 can be attached to ribbons that are electrically or magnetically conductive to serve doubly as conventional radio frequency chaff. The retro-reflective chaff can be formed in thin metalized materials, such as plastic with imprinted trihedrals. The thin metalized materials can form shapes of confetti, ribbons or ping-pong size balls having corner retro-reflecting trihedrals distributed along the outer surface (analogous to dimples on a golf ball incorporated to reduce drag by extending boundary layer attachment). These concepts extend to other types of retro-reflectors that rely on metalized backings of different indices of refraction from a primary retro-reflector.

Individual retro-reflectors can be fabricated at varying scales or painted onto substrate materials to control buoyancy in air. Under select conditions, the exemplary chaff can remain buoyant for extended periods. Other circumstances might prefer exemplary chaff to descend gradually to shift an active infrared seeker off-course from the intended target that dispensed the chaff. The particulate size and the density substrate of the exemplary chaff can be tailored to loiter or fall at a substantially constant rate of descent, while reflecting back (rather than dissipating away) the electromagnetic energy being directed at the chaff-dispersing target.

The advantage of chaff using the corner reflector 110 is that this configuration can neutralize a threat using the threat's own energy. Thus, the defense mechanism can be cheap, light weight and low cost due to its passivity. Further, the chaff can be fabricated so as to be environmentally safe and thereby acceptable to the international community. For example, the chaff can be fabricated from biodegradable corn starch or wood that has been metalized, i.e., coated or plated with metal.

FIG. 5 shows an elevation view 500 of a corner reflector 110 orienting itself naturally for space-based laser, sensor (e.g., radar) or communication systems as the corner reflector 110 falls through the atmosphere. Aerodynamic influence can be represented as airflow 510 being viscously deflected with the stagnation point located at the corner 140. The corner reflector 110 can reflect electromagnetic energy from above while falling, receiving an emission beam 150 and returning a reflection beam 180. FIG. 6 shows an elevation view 600 of a plurality of corner reflectors 110 in a stacked array 610 for compact storage before tactical deployment.

FIG. 7 shows a graphical view 700 of reflectance variation of gold, silver and aluminum across wavelengths to indicate reflective effectiveness dependence on surface coating of a corner reflector 110. A logarithmic scale of wavelength represents the abscissa 710 from 0.2 µm to 5 µm (i.e., ultraviolet to mid-infrared), while reflectance represents the ordinate 720. The plotted curves include aluminum (Al) 730, silver (Ag) 740 and gold (Au) 750. As can be observed, aluminum maintains reflectance above 0.86 across all plotted wavelengths, whereas silver and gold are below 0.5 µm at wavelengths smaller than 0.33 µm and 0.5 µm, respectively. The plotted trends indicate that aluminum would be preferable at ultraviolet and visible wavelengths, while gold and silver would be preferable at infrared (IR) wavelengths, with minor differences for microwave wavelengths.

Figure 8:
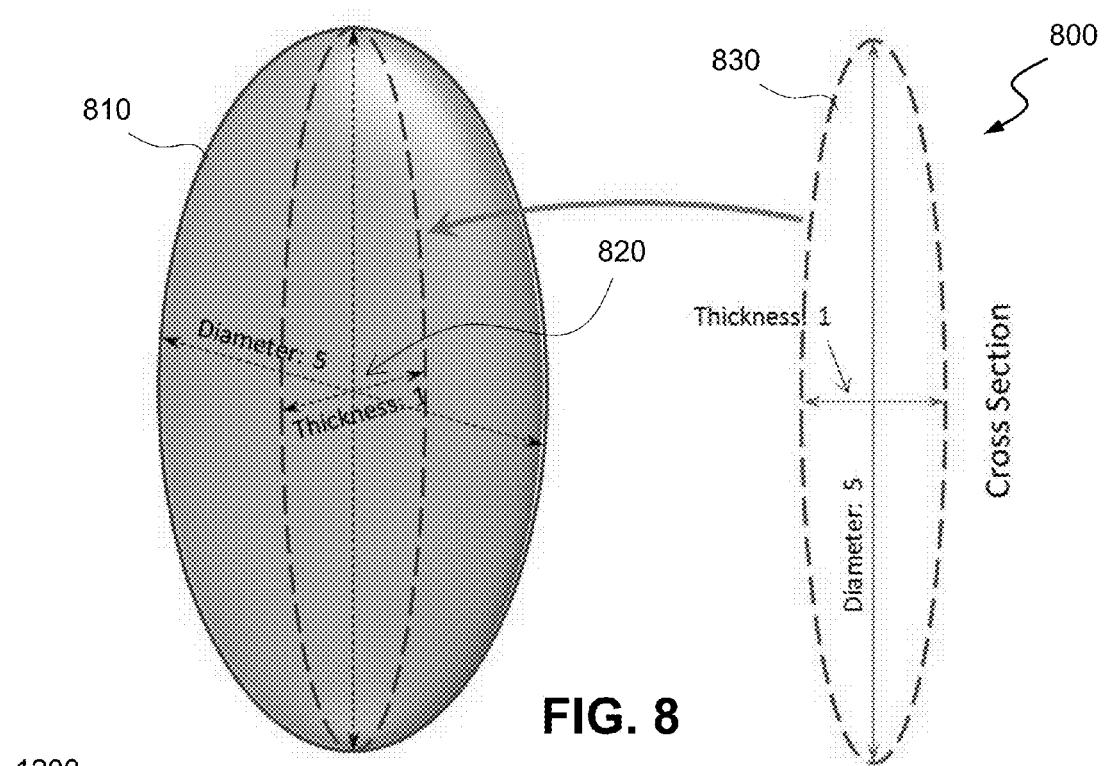
FIG. 8 is a geometrical view of a flattened ellipsoid as representative of a retro-reflective chaff profile.

After being deployed, chaff often disperses approximately into an ellipsoid cloud, though this can be influenced by the delivery technique. FIG. 8 shows a geometrical view 800 of a flattened ellipsoid cloud 810 having a center of mass 820 as representative of a retro-reflective chaff dispersion profile. In this example, the height and width can be quantified as a diameter, and the lateral dimension can be quantified as a thickness. The cross-section 830 of diameter and thickness can be projected from the ellipsoid cloud 810.

Figure 9:
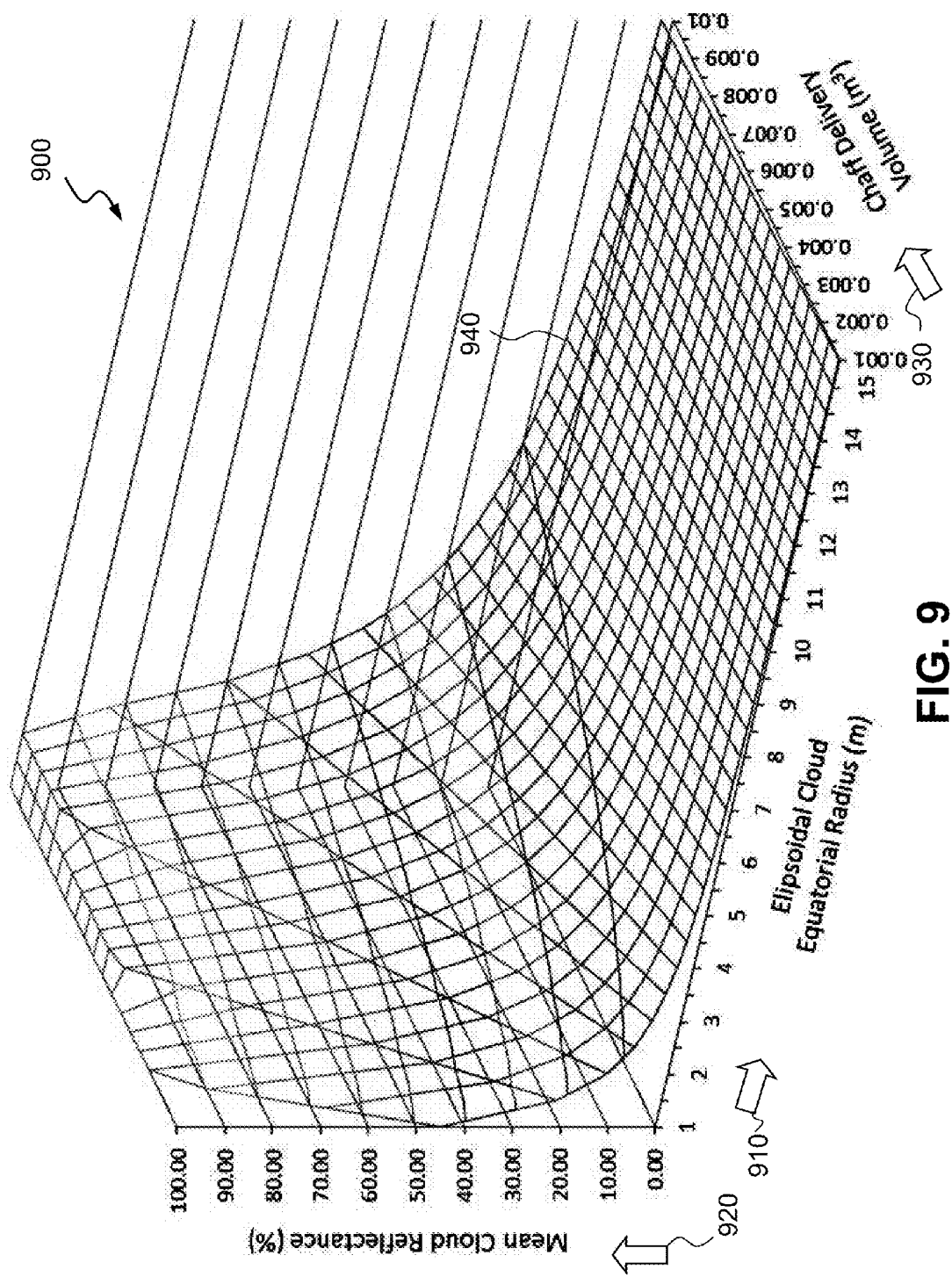
FIG. 9 is a three-dimensional graphical view of mean chaff reflectance as a function of cloud radius and delivery canister volume.

FIG. 9 shows a three-dimensional graphical view 900 of chaff volume in a canister and as a function of ellipsoidal cloud radius. Ellipsoid equatorial radius in meters represents the horizontal abscissa 910. Mean cloud reflectance in percentage represents the ordinate 920. Chaff delivery volume in cubic meters represents the lateral abscissa 930. A curvature surface 940 denotes the variation of reflectance for assumed initial chaff volume in a canister, and as a function of ellipsoidal cloud radius. The trends show rapid reduction of cloud reflectance as ellipsoid radius increases, mitigated by increases in chaff delivery volume.

Figure 10A:
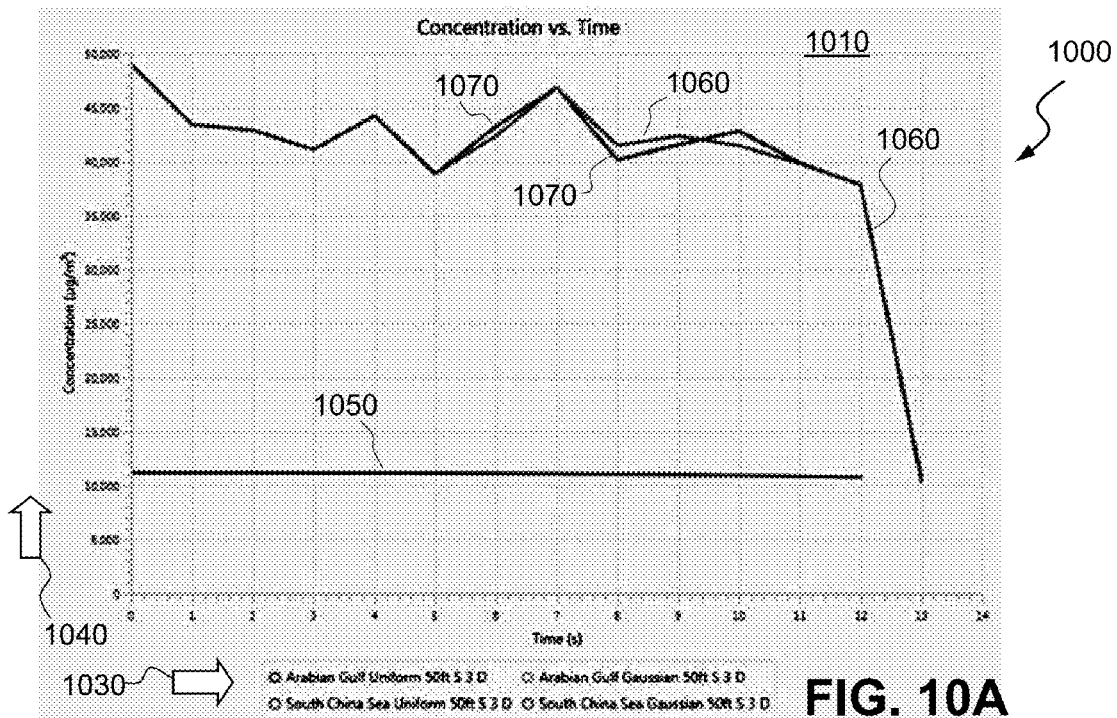
FIGS. 10A and 10B are graphical views of simulation results of a retro-reflective chaff showing temporal concentration as a function of time while falling from various heights.
Figure 10B:
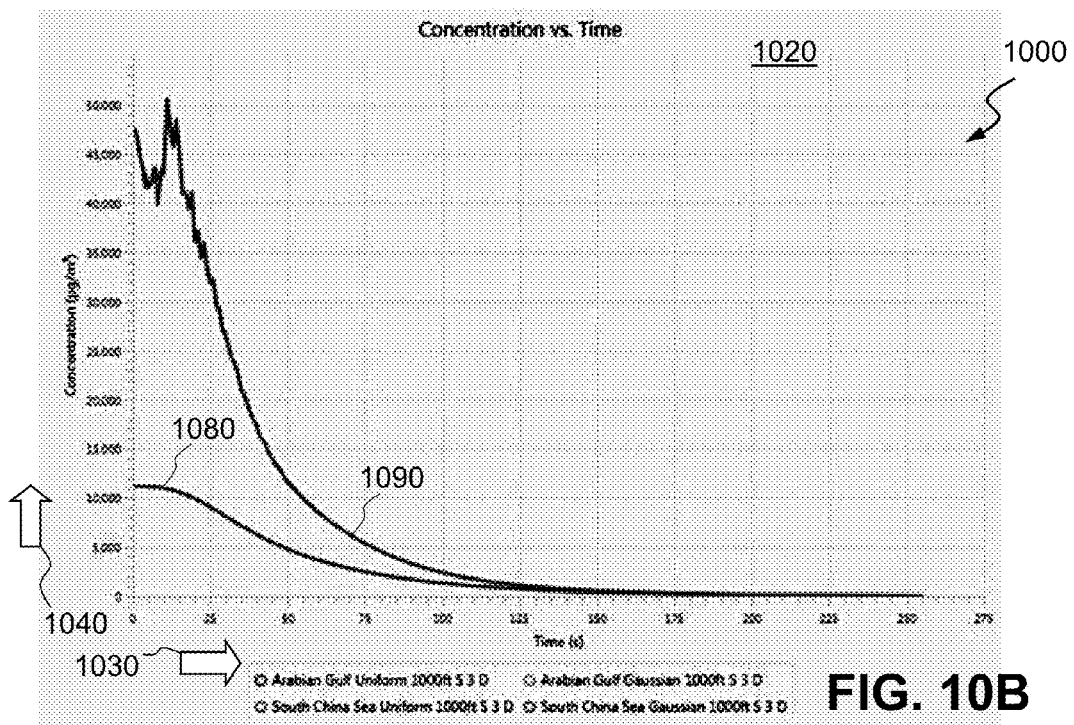

FIGS. 10A and 10B show graphical views 1000 of simulation results of a retro-reflective chaff temporal concentration while falling at a particular rate. The upper plot 1010 in FIG. 10A illustrates results for a chaff cloud launched at 50 feet altitude, while FIG. 10B illustrates results for a chaff cloud launched at 1000 feet altitude. Time represents the abscissa 1030 while concentration in micrograms-per-cubic-meter represents the ordinate 1040 for both plots, which show a lingering concentration from 10 seconds to 20 seconds depending on altitude.

For the first plot 1010, the flat concentration 1050 at constant 11 mg/m$^3$ denotes a first global location Gaussian profile at 50 feet. The leveling concentrations 1060 and 1070 denote Gaussian profiles for first and second global locations from 50 mg/m$^3$ and descending. For the second plot 1020, the tapering concentration 1080 starting at 11 mg/m$^3$ denotes first global location profile at 50 feet, while precipitating concentration 1090 denotes first global location profile at 1000 feet that starts at near 48 mg/m$^3$.

Figure 11:
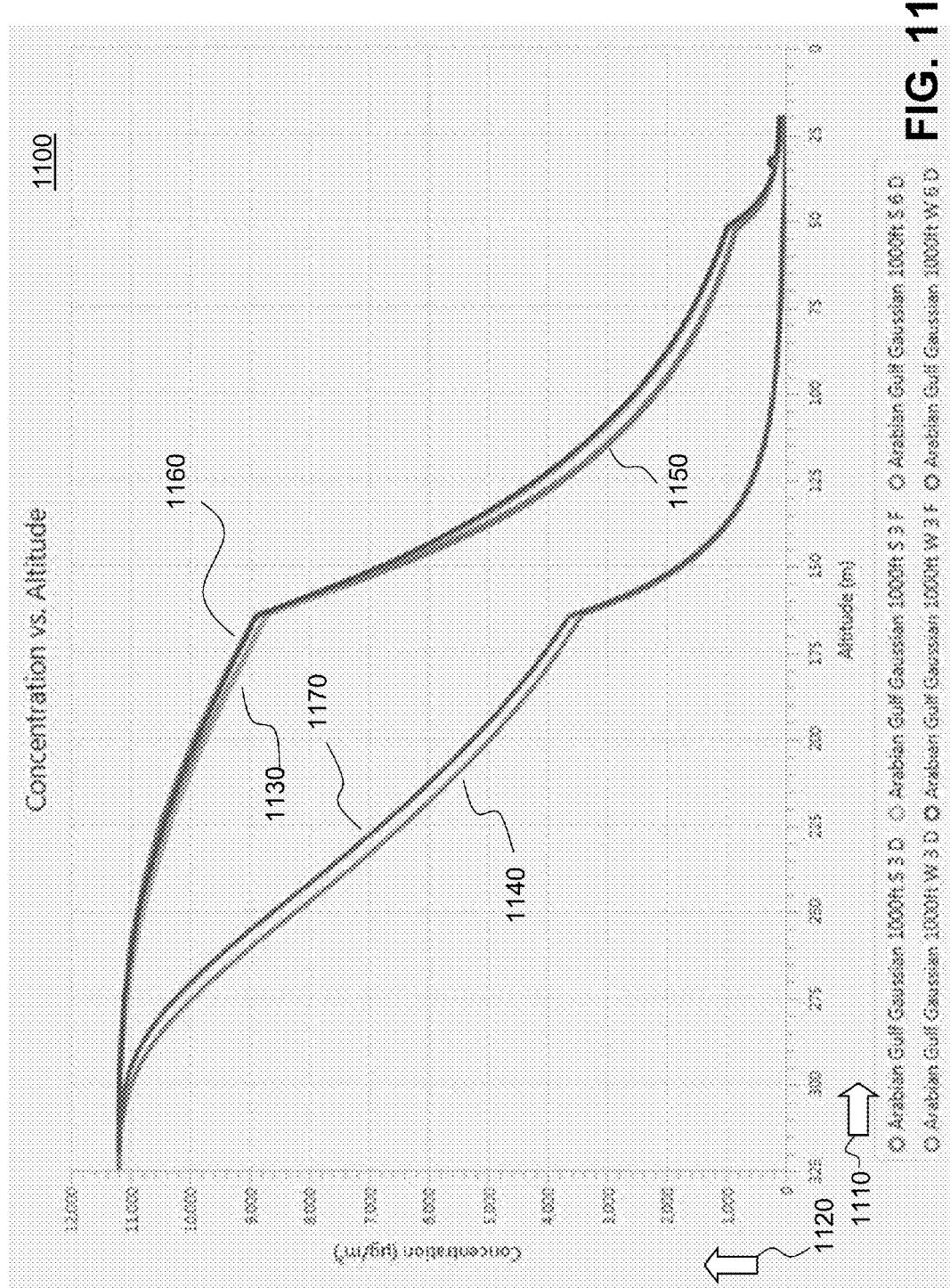
FIG. 11 is a graphical view of simulation results for variation of retro-reflective chaff concentration with altitude.

FIG. 11 is a graphical view 1100 of simulation results for variation of retro-reflective chaff concentration with altitude. Altitude in meters represents the abscissa 1110 and concentration in micrograms-per-cubic-meter represents the ordinate 1120. The curves, all descending gradually or rapidly from the initial concentration of 11.2 mg/m$^3$ towards zero, begin at an initial altitude of 325 feet elevation. The second global location Gaussian curves at 1000 feet include south with three-degrees of freedom (F) 1130, south with six-degrees of freedom (D) 1140, west with three degrees (D) 1150, west with three-degrees (F) 1160, west with six-degrees (D) 1170. The results from a computer simulation illustrate retro-reflective chaff concentration as a function of altitude. The cloud maintains concentration for a significant portion of altitude until wind and atmospheric boundary layers cause dispersion.

Figure 12:
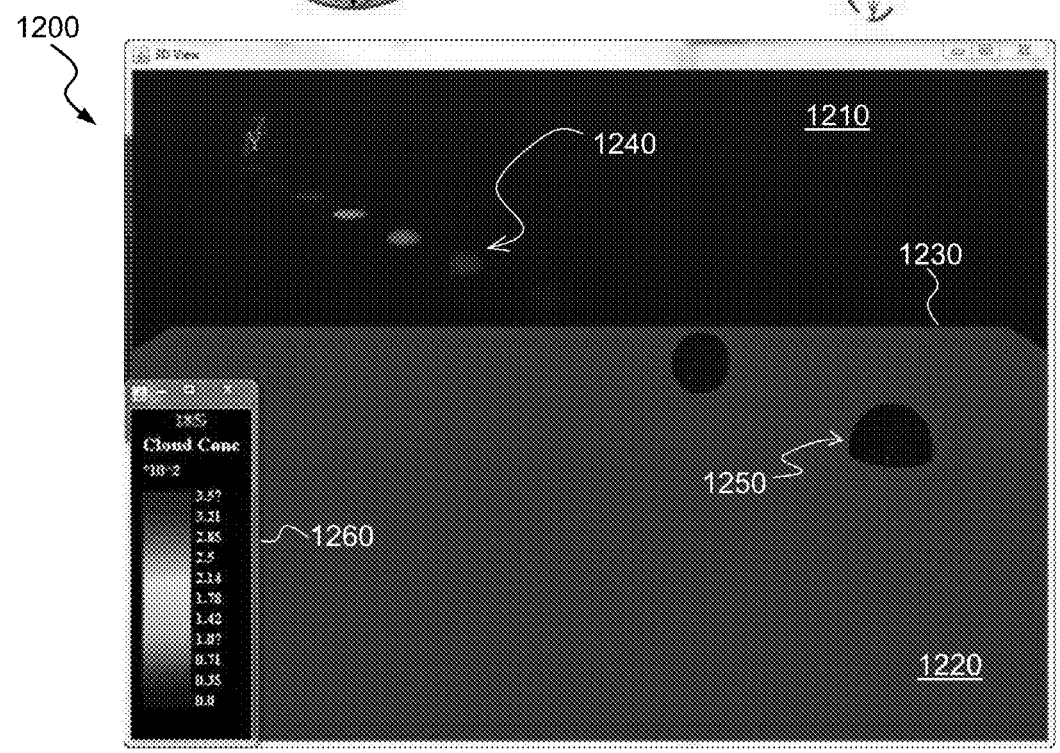
FIG. 12 is a model view of a retro-reflective cloud while descending through the atmosphere encountering various boundary layers.

FIG. 12 is a model view 1200 of a retro-reflective cloud 810 while descending through the atmosphere, which is divided into upper 1210 and lower 1220 portions separated by a boundary 1230. The retro-reflective cloud 810 assumes conditions of a Gaussian profile launched at 1000 feet and dropping in a summer atmosphere at 3 m/s. The initial dispersion travels vertically downward and drifts horizontally as small ellipsoids 1240 in the upper atmosphere 1210 and as rounder spheroids 1250 in the lower atmosphere 1220. A legend 1260 indicates cloud cone concentration from initial deployment to dissipation.

Figure 13:
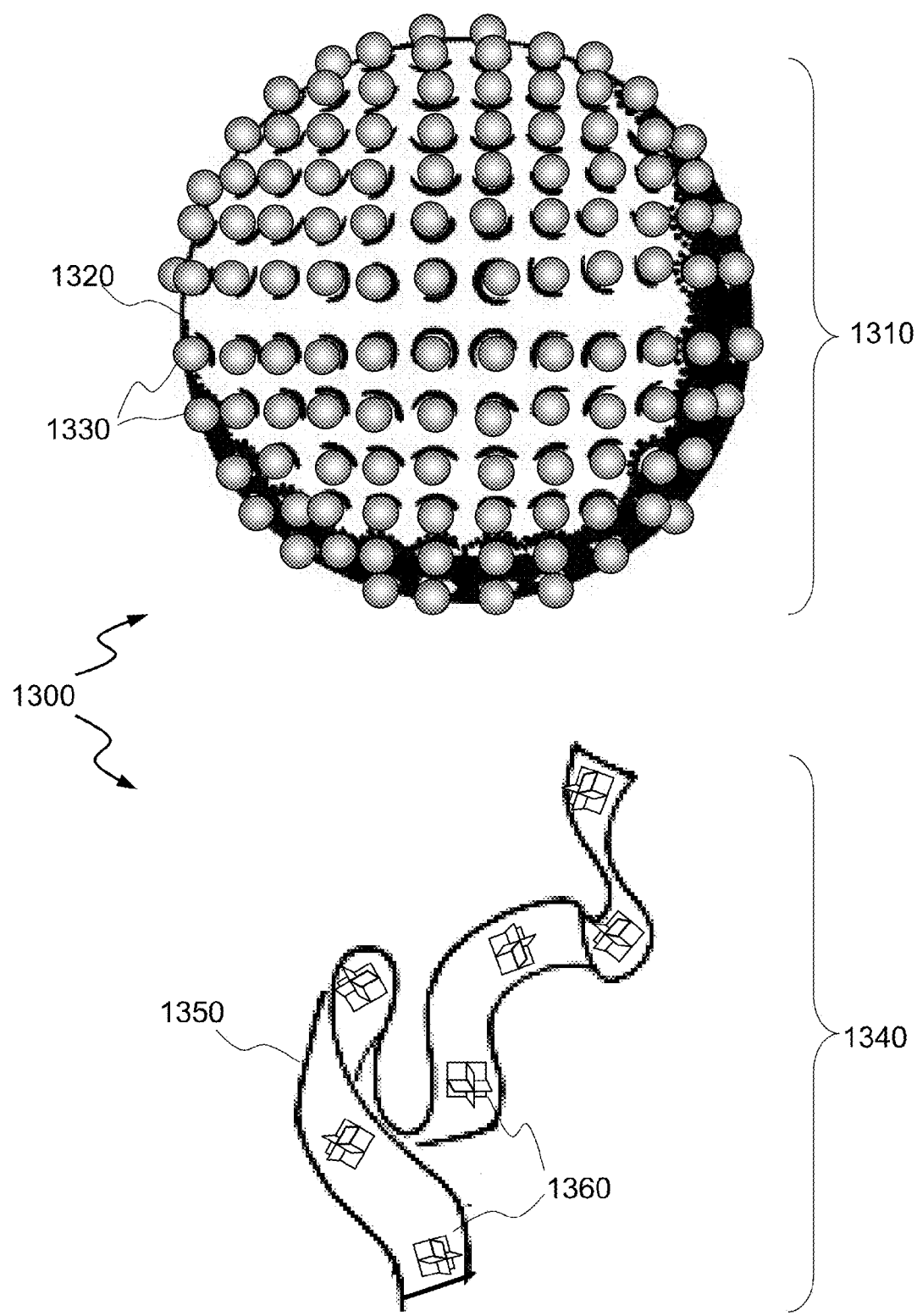
FIG. 13 is a model view of retro-reflective particles on substrates.

FIG. 13 shows model views 1300 of substrates to which exemplary retro-reflectors can be attached. An exemplary globe-shaped bubble 1310 about one-to-four centimeters in diameter represents a first such substrate example. The bubble 1310 includes a hollow quasi-spherical substrate 1320 with cat's eye retro-reflectors 1330 attached or embedded thereon. The substrate 1320 can include a metallic exterior, while the cat's eye retro-reflectors 1330, analogous to the exemplary retro-reflector 410, can comprise an optically transparent light-weight material. Alternatively, trihedrals or prisms or other such retro-reflectors can be attached for such purposes. The bubble 1310 can be evacuated and/or filled with helium or other light-weight gases to control buoyancy.

An exemplary ribbon 1340 represents a second such substrate example. The ribbon 1340 includes a long thin strip substrate 1350 with trihedral retro-reflectors 1360 attached thereto. Alternatively, the ribbon 1340 can constitute a thin panel of confetti. The substrate 1350 and retro-reflectors 1360 can include metallic or dielectric exteriors. For metallic exteriors, the ribbon 1340 can act as a retro-reflector to optical through millimeter wave radiation, and as typical scattering chaff to radio frequency (RF) radiation wavelengths.

Alternatively, the retro-reflectors can be prisms or cat's eyes in configuration. Both substrates 1320 and 1350 can incorporate respective retro-reflectors 1330 and 1360 of varying sizes so as to engage electromagnetic energy threats from a multitude of available targeting frequencies.

The chaff can be fabricated to control its aerodynamics, such that the retro-reflectors can be mixed with standard RF chaff or IR-visible obscurant should a need arise for double duty from one chaff dispenser. For example, if the laser is space-based, a single corner reflector design would be sufficient, as the aerodynamics enable the corner reflector 110 to align upward for space-based beams 150 as shown in view 500. Such a configuration can also be stacked 610 for placement into a small volume as shown in view 600.

The metallization used can be selected for maximum reflectivity when the wavelength range of interest is known, or from a universally reflective material. For example, view 700 shows gold 750 has a higher reflectance than aluminum 730 at longer wavelengths into the infrared while aluminum has lower reflectance, while aluminum shows a broader spectral response overall. Thin-film techniques that incorporate interference of the electromagnetic waves or nanotechnology could also be used to enhance reflectivity.

One common deployment of conventional chaff initiates as a cloud in the shape of a flattened ellipsoid 810 as shown in view 800. This configuration approximates a cloud profile achievable through known deployment mechanisms and assumes a 5:1 equatorial diameter to thickness ratio. Flattened ellipsoid chaff clouds offer enhanced military utility over other shapes and that would also be the case for retro-reflective chaff depending on the concept of operation (CONOPS), details of which can be sensitive. The chaff can be deployed by compressed gas or other known mechanisms. In exemplary embodiments, the cloud boundaries exhibit Gaussian characteristics, but can be of other density profiles as well.

To be effective, the deployed cloud must have more than ten-thousand retro-reflective units. Each unit can be of equal size, different size, or mixed in with traditional chaff depending on CONOPS. This may include a demand for the cloud to maintain its concentration density for a time interval, thereby yielding retro-reflective chaff units that are consistent in size. For a cloud distribution to elongate vertically after initiation, then multiple sizes and/or weight can be mixed into the chaff. Other cloud shapes include planar, spherical, tubular and elliptical.

An example of retro-reflectivity from a confined chaff volume that is expanded into a cloud is shown in view 900. In this example, each retro-reflective particle, whether configured as an octal of trihedrals, a Porro prism, a cat's eye, a Luneburg lens, or other mechanism has an assumed 70% retro-reflectivity. Thus, for example, a chaff delivery volume of 0.01 m³ deploys with a 50% retro-reflectivity with a mean cloud radius of approximately 3 m. Further, one can assume that the chaff particles are electrically neutral, although the chaff particle could be electrically charged upon launch to produce other profiles and faster density distributions and shapes.

Each chaff cloud is deployable from a single canister and will be sufficiently durable to survive storage and deployment dynamics while retaining optical retro-reflectance characteristics. Maximum terminal velocities once deployed (drop velocities) are not anticipated to exceed that of rain, which is approximately 9.6 m/s. The terminal velocity is achieved through particle weight and size manipulations and can be reduced to near 0 m/s. Optical and high frequency electromagnetic radiation bounds exemplary retro-reflective chaff to sizes from 0.4 μm to 1 cm, covering bands from ultraviolet to millimeter wave radiation.

As further explanation, particulate sizes of the exemplary chaff can be associated with dimensions related to specular reflection. In particular, using the well-known relation:

$$x = \frac{2\pi r}{\lambda}, \quad (7)$$

where x denotes a dimensionless reflection scale, r denotes characteristic length of the particle and λ is radar wavelength, then a scale can be defined for the particulates as having ratio $$\frac{r}{\lambda} \geq 2.$$

This condition indicates the specular region of reflection, rather than the Mie scattering or Rayleigh scattering regimes.

Thus, when ratio $$\frac{r}{\lambda} \geq 2,$$

then reflection scale x≥12.6, which can be treated as x>>1 as an order of magnitude greater than unity. This provides scale over the regions of operation that range from λ=0.3 μm (edge of ultraviolet) to λ=1 cm (edge of millimeter-wave). For the laser, perhaps better examples include fiber lasers that can operate at various wavelengths depending on design and dopants. Common laser wavelengths are 1.06 μm and 1.55 μm, but others exist as well.

For an exemplary density distribution as a function of time and concentration for a cloud deployed with a 5:1 equatorial diameter to polar length ratio, parameters can be established as initial delivery volume of 0.009 m³ (about 2.38 gallons), cloud equatorial diameter of 6.1 m, and retro-reflective chaff particle density of 4.5·10⁶ per-cubic-meter. For purposes of analysis, the size of the retro-reflecting chaff particles was assumed to be 500 μm (0.5 mm) with a notional weight of 30 mg resulting in an approximate estimated terminal velocity of 2 m/s. (This characteristic length is about two orders of magnitude larger than the preference.) Weather conditions of winter and summer are assumed at two global locations over water with nominal deployment altitudes of 10 feet, 50 feet, 100 feet, 500 feet, 1000 feet and 5000 feet.

A first example of results show concentration as a function of time for two different launch altitudes at 50 feet and 1000 feet, for example as shown in view 1000. In this example, the density of the cloud maintains for at least 10 seconds and up to approximately 20 seconds depending on launch altitude. This density consistency can be important to select military CONOPS. View 1100 illustrates the concentration as a function of altitude and demonstrates a consistent concentration for a significant altitude drop, which then gets dispersed mostly due to wind speed, and atmospheric boundary layers. View 1200 shows an image of the cloud dropping through the atmosphere that assumes conditions of a Gaussian profile launched at 1000 feet in a summer atmosphere at 3 m/s.

For chaff used at optical or extremely high (EHF) frequencies (one-to-ten millimeter wavelengths), the retro-reflectors would comprise fibrous materials that can get lodged deep in the lungs, causing health issues—similar to those induced by asbestos. By contrast, the much smaller exemplary chaff does not contain such fibrous materials, and the normal lung evacuation process would render the material safe.

Exemplary embodiments provide chaff that effectively directs electromagnetic radiation back to its source. Broadly, exemplary embodiments provide a defense mechanism against an adversary's use of laser, or other such electromagnetic weapons. Directed energy may be reflected back to the source, thus using the adversary's own energy against them. Such directed energy weapons require considerable energy to operate, and can suffer damage when a small portion is fed back into the source. Corner reflectors 110 are geometrically shaped objects used to reflect energy directly back to a source. Exemplary incorporation of corner reflectors 110 in chaff enables friendly military platforms to escape while concurrently neutralizing the adversary's directed energy asset.

Corner reflectors 110 and/or multi-reflectors 210 can be fabricated cheaply. For example, they can be fabricated from cheap plastic to reduce cost and plated with a thin metallic coating. They can be fabricated to have one to eight reflectors, or more, in each individual unit to control aerodynamic and directional aspects. They can be fabricated of various sizes and materials to control their buoyancy in the air. Corner reflectors 110 can be designed so they pack together tightly in a package 610 to minimize storage volume. The chaff can be used for other applications, such as a disruption in communications between two points. Other forms of retro-reflectors exist that are suitable for retro-reflecting chaff.

As an example of application, an aircraft might detect illumination by an adversary's laser beam, or other electromagnetic weapon. In response, the aircraft might immediately turn in a direction away from the weapon and launch a canister of corner reflector chaff. By releasing the chaff to be disposed between the adversary's weapon and the target craft, the corner reflectors directs the laser weapon back on itself and into the adversary's directed energy weapon causing damage to, and neutralizing the threat with its own energy.

Other applications for the corner reflector chaff exist as well. For example, the corner reflector chaff can be used to protect commercial craft, for example, from internal or external threats. Exemplary embodiments could be used to temporarily disrupt communications by dropping the material between a transmitter and a receiver, and thus be useful for law enforcement. Also, retro-reflecting chaff can provide a more efficient distress signal than conventional chaff. Also, retro-reflecting chaff can prevent optical trackers from maintaining track.

Damage to the deployed retro-reflective chaff is inconsequential due to its low fabrication cost and prospective biodegradability, both to promote expendability. The exemplary chaff only needs to last for sufficient duration to either damage the threat, or for the target craft to move to a safe distance from the laser weapon directed thereto. In fact, the number of corner reflectors for the multi-corner configuration 210 mitigates the primary counter-counter-measure available to an opponent. In particular, an intense beam would be required to degrade a single reflector and either dissipate its energy as heat at the chaff cloud or serve as a sacrificial element for part of the beam with other inexpensive reflectors loitering for backup.

Exemplary embodiments, as well as parent application Ser. No. 13/374,641 include octal trihedrals fabricated from metal or with a metal covering only. Alternative embodiments include transparent prisms with indices of refraction that differ from the ambient air that the chaff operates. Both configurations utilize particulates that visually small or microscopic. Exemplary embodiments are distinguishable from U.S. Pat. No. 2,475,633 to Morris et al. disclosing a spring-loaded corner reflector; U.S. Pat. No. 6,061,012 to Sakimura disclosing a radar reflector of circular plates with a diameter of 44 mm; U.S. Pat. No. 4,072,948 to Drews et al. disclosing a balloon-suspended reflector; U.S. Pat. No. 2,746,035 to Norwood disclosing a balloon-suspended disk with medially intersecting semicircular elements; U.S. Pat. No. 4,099,183 to Wolff providing a passive reflective element with a corner reflector as a location marker; U.S. Pat. No. 7,623,059 to Klein teaching dispersing scattering media from an aircraft; and U.S. Pat. No. 4,852,452 to Barry et al. disclosing corner cube retro-reflectors on satellites to deflect radar attacks.

The exemplary embodiments are distinguishable by specular return reflection, rather than conventional scattering. Additionally, exemplary embodiments are not restricted to corner reflectors or to operating in isolation, as they can be attached to substrate materials to benefit from conventional chaff to serve multiple purposes against a wide range of electromagnetic search frequencies. The goal for the exemplary embodiments is to retro-reflect light from the millimeter to ultraviolet bands for return to the radiation source for its effective neutralization against the intended target that releases the exemplary retro-reflecting chaff.

Artisans of ordinary skill will recognize that many additional changes in the details, materials, steps and arrangement of parts, which have been herein described and illustrated herein in order to explain the nature of the invention, may be performed within the principle and scope of the invention as expressed in the appended claims. It is, therefore, to be understood that the appended claims are intended to cover all such modifications and changes as fall within the true spirit of the embodiments.

What is claimed is:

1. Chaff for deployment from an aerial platform for retro-reflecting electromagnetic radiation projected to said platform, said chaff comprising:
    a plurality of retro-reflecting particles, each particle being a cat's eye retro-reflector having an index of refraction twice that of ambient; and
    a substrate for attaching said plurality of particles, said substrate being a plurality of hollow spheres.

2. The chaff according to claim 1, wherein said plurality includes particles having plural characteristic lengths.

3. The chaff according to claim 1, wherein said plurality forms a cloud having aerial buoyancy to substantially assume an ellipsoid shape.

4. The chaff according to claim 3, wherein said aerial buoyancy enables said cloud to loiter.

5. The chaff according to claim 3, wherein said aerial buoyancy enables said cloud to descend at a substantially constant rate.

* * * * *